United States Patent [19]
Nemoto

[11] Patent Number: 5,828,744
[45] Date of Patent: Oct. 27, 1998

[54] CALL WAITING PROCESSING SYSTEM, AND ORIGINATING TERMINAL UNIT, DESTINATION TERMINAL UNIT AND ORIGINATING/DESTINATION TERMINAL UNIT UTILIZED IN THE SAME SYSTEM

[75] Inventor: Kenji Nemoto, Kawasaki, Japan

[73] Assignee: Fujitsu Limited, Kanagawa, Japan

[21] Appl. No.: 597,264

[22] Filed: Feb. 6, 1996

Related U.S. Application Data

[63] Continuation of Ser. No. 64,223, May 18, 1993, abandoned.

[30] Foreign Application Priority Data

May 19, 1992 [JP] Japan ..................... 4-125180

[51] Int. Cl.⁶ ............................. H04M 3/48
[52] U.S. Cl. ................. 379/215; 379/209; 379/309
[58] Field of Search ..................... 379/209, 309, 379/265, 266, 215, 96, 93, 94; 370/522, 468

[56] References Cited

U.S. PATENT DOCUMENTS 4,807,276  2/1989  Okabe .................... 379/93
4,958,153  9/1990  Murata et al. .......... 379/94

*Primary Examiner*—Ahmad F. Matar
*Attorney, Agent, or Firm*—Helfgott & Karas, P.C.

[57] ABSTRACT

A call waiting processing system used in an ISDN network includes an originating terminal unit and a destination terminal unit. To reduce an inefficient load on the terminal units, resulting from an unacceptable call setting, the system is configured such that when the originating terminal unit is in a calling mode, provided that the destination terminal unit is in a busy mode, the originating terminal unit requests a notification of a waiting period available for call setting to the destination terminal unit. When the destination terminal unit receives a notification request for a waiting period from the originating terminal unit, it notifies the originating terminal unit of the waiting period.

24 Claims, 11 Drawing Sheets

CALL WAITING PROCESSING SYSTEM, AND ORIGINATING TERMINAL UNIT, DESTINATION TERMINAL UNIT AND ORIGINATING/DESTINATION TERMINAL UNIT UTILIZED IN THE SAME SYSTEM

This is a continuation of application Ser. No. 08/064,223, filed May 18, 1993 (now abandoned).

BACKGROUND OF THE INVENTION

1). Field of the Invention

The present invention relates to a call waiting processing system used for terminal units included, for example, in the integrated services digital network, and an originating terminal unit, a destination terminal unit, and an originating/destination unit, which can have either the originating unit function and the destination unit function, employed in the same system.

2). Description of the Related Art

FIG. 11 is a block diagram showing an example of a conventional terminal unit. Referring to FIG. 11, numeral 200 represents an integrated services digital network (hereinafter referred to as ISDN), and 201 and 202 each represent a terminal unit used in the ISDN 200. The terminal units 201 and 202 each include a first layer function unit 211 acting as a well-known physical layer (first layer), a second layer function unit 212 acting as a well-known data link layer (second layer), and a third layer function unit 213 acting as a well-known network layer (third layer).

When a terminal unit 201 intends to communicate with another terminal unit 202 by way of the ISDN network 200, it prepares a call setting message SETUP to send it to the terminal unit 202 through the ISDN network 200.

The terminal unit 202 receives the call setting message SETUP from the terminal 201. If the terminal unit 202 is busy or cannot establish a call setting, it prepares a release completion message REL COMP including information indicative of a call setting unavailable state to send it to the terminal 201 by way of the ISDN network 200.

Since the terminal unit 201 which receives the release completion message REL COMP cannot obtain the information about the time when the terminal unit 202 is in a call setting available state, it repeats sending a call setting message SETUP to the terminal unit 202 until the call setting is successful.

As is obvious from the above explanation, when the destination terminal unit 202 is in a call setting unacceptable or unavailable state, the originating terminal unit 201 cannot know the time when the destination unit is available for a call setting. Therefore the conventional terminal unit has a disadvantage that requests for the call setting must be repeated to obtain a successful call setting whereby an ineffective load to both terminal units 201 and 202 and the ISDN network 200 increases.

SUMMARY OF THE INVENTION

It is an object of the present invention to overcome the above mentioned problems. It is another object of the present invention to provide a system and a terminal unit for processing a call waiting, where an ineffective load to a terminal unit or a communication network including the same can be reduced without repeatedly requesting for call setting when an originating terminal unit fails to obtain a call setting.

Yet another object of the present invention is to provide a method and a terminal unit which can reserve a call setting after a lapse of a waiting period and can certainly perform a call setting after the waiting period if an originating terminal unit has failed to obtain a call setting.

Still another object of the present invention is to provide a method and a terminal unit wherein if an originating terminal unit failed to obtain a call setting when a reserved call setting can be required after a lapse of a waiting period, a reservation call setting can be automatically made at the time of reservation whereby a call setting can be automatically performed after a lapse of a waiting period.

The call waiting system according to the present invention is characterized by an originating terminal unit; and a destination terminal unit; the originating terminal unit requesting a notification of a call setting available waiting period to the destination terminal unit when the originating terminal unit transmits an originating call while the destination terminal unit is in a call setting unavailable state; and the destination terminal unit notifying the originating terminal unit of the waiting period when the destination terminal unit receives the waiting period notification request from the originating terminal unit.

According to the present invention, the originating terminal unit reserves a call setting after the waiting period to the destination terminal unit when information about the waiting period is received from the destination terminal unit.

Furthermore, according to the present invention, the originating terminal unit requires a reserved call setting to the designation terminal unit after the waiting period when the designation terminal unit accepts and provides a call setting reservation after the waiting period which is sent from the originating terminal unit.

The call waiting processing system according to the present invention includes an originating terminal unit for notifying a destination terminal unit of a communication period for an originating call when the originating terminal unit calls; the originating terminal unit requesting a waiting period notification of the time available for a call setting to the destination terminal unit when the destination terminal unit is in a call setting unavailable state; the destination terminal unit calculating the waiting period when the destination terminal unit receives a waiting period notification request from the originating terminal unit, and then notifying the originating terminal unit of the outcome: the originating terminal unit reserving a call setting to the designation terminal unit for reserving a call setting after the waiting period when the destination terminal unit notifies the originating terminal unit of the waiting period, whereby the destination terminal unit registers the accepted reservation call, together with a communication period for the received reservation call informed by the originating terminal unit and a time after the waiting period for said reserved call when the destination terminal unit reserves the call setting from the originating terminal unit, the communication period being for the reserved call notified by the originating terminal unit, while the originating terminal unit registers the reservation call together with the communication period of the reservation call and a time after the waiting period for the reserved call notified by the destination terminal unit.

According to the present invention, the destination terminal unit obtains a final call process completion time after the registered reservation communication period and then calculates the difference between the final call process completion time and a present time as the waiting period, that time being a time after the waiting period registered for a finally reserved call.

According to the present invention, the originating terminal unit requires a setting of the reserved call to the destination terminal unit when a time after the waiting period of the registered reserved call.

The originating terminal unit of the call waiting processing system includes a communication period notifying means for notifying a destination terminal unit of a communication period necessary for a communication after calling; and waiting period notification requesting means for requesting a notification of a waiting period by a call setting available time to the destination terminal unit when the destination terminal unit is unable to set a call.

The originating terminal unit of the call waiting processing system according to the present invention further includes communication period calculating means for calculating the communication period, based on the amount of transmission data and a line rate.

The originating terminal unit of the call waiting processing system according to the present invention further includes call setting reserving means for reserving a call setting after the waiting period to the destination terminal unit when the waiting period is notified by the destination terminal unit in response to a waiting period notification request from the waiting period notification request means.

Furthermore, the originating terminal unit of the call waiting processing system according to the present invention includes reservation control means for registering a received reserved call, together with an originating time when the call setting reservation from the call setting reserving means is accepted by the destination unit, the originating time being a time after a waiting period for a reservation call setting notified by the destination terminal unit.

According to the present invention, the originating terminal unit of the call waiting processing system further includes reservation call setting requesting means for requesting the reservation call setting to the destination terminal unit accepting the reservation call at a reservation call originating time registered in the reservation control means.

The destination terminal unit of the call waiting processing system includes waiting period calculating means for calculating a waiting period for the time when a call setting is available, when a terminal unit of the system is not able to perform a call setting; and waiting period notifying means for notifying an originating terminal unit of a waiting period calculated by the waiting period calculating means when a call cannot be set at the destination unit while a notification request of the waiting period from the originating terminal unit is received.

According to the present invention, the destination terminal unit of the call waiting processing system further includes reservation accepting means for accepting a reservation of the call setting when the originating terminal unit reserves a call setting after the waiting period, the originating terminal unit being informed of a waiting period by the waiting period notifying means.

According to the present invention, the destination terminal unit of the call waiting processing system further includes reservation control means for registering an accepted reserved call, together with a communication period for the reservation call notified from the originating terminal unit and a destination time after the waiting period for the reserved call, calculated by the waiting period calculating means, when the reservation accepting means accepts a reservation for the call setting from the originating terminal unit.

According to the present invention, in the destination terminal unit of the call waiting processing system, the waiting period calculating means includes final call process completion time calculating means for calculating a final call process completion time after a finally received reservation call has passed from a destination time registered by said reservation control means, by a communication period registered for the reservation call; and time difference calculating means for calculating, as a waiting hour, the time difference between the final call process completion time calculated by the final call process completion time calculating means and a present time.

The destination terminal unit of the call waiting processing system according to the present invention further includes reservation call setting means for setting the reservation call when the originating terminal unit, reserving the reservation call setting, has requested the reservation call setting after the destination time of the reserved call registered in the reservation control means.

A terminal unit may be used in a call waiting processing system of the present invention, which can function as the originating unit or the destination unit. Such terminal unit comprises communication period notifying means for notifying another destination terminal unit of a communication period required after calling; waiting period notification requesting means for requesting a notification of a waiting period by a call setting available time to said destination terminal unit when the destination terminal unit cannot set a call; waiting period calculating means for calculating a waiting period of one terminal unit of the call waiting processing system by a call setting available time when said one terminal unit cannot perform a call setting; and waiting period notifying means for notifying another terminal unit of a waiting period by a call setting available time of the one terminal unit calculated by the waiting period calculating means when a call setting cannot be performed at the time of calling to the destination unit from said another terminal unit while a notification request of a waiting period by a call setting available time sent from the waiting period calculating means is received from said another terminal unit.

According to the present invention, the terminal unit which can have both functions of the originating and destination terminal units in the call waiting processing system further includes communication period calculating means for calculating the communication period based on both the amount of transmission data during the calling period and a line rate.

According to the present invention, the originating/destination terminal unit used in the call waiting processing system further includes call setting reserving means for reserving a call setting after a waiting period of the destination terminal unit to the destination terminal unit when a waiting period of the destination terminal unit is informed by the destination terminal unit in accordance with a notification request of a waiting time from the waiting period notification requesting means; and reservation accepting means for accepting a reservation of the call setting when said another terminal unit reserves a call setting after a waiting period of said one terminal unit, said another terminal unit informing of a waiting period of the one terminal unit via the waiting period notifying means.

According to the present invention, the originating/destination terminal unit used in the call waiting processing system includes reservation canceling means for preventing the call setting reserving means from accepting a reservation to the destination terminal unit when a waiting period of the destination terminal unit which is informed by the destination terminal unit in accordance with a waiting period notification request from the waiting period notification requesting means is shorter than the waiting period of the one terminal unit calculated by the waiting period calculating means.

According to the present invention, terminal unit which can have the functions of the originating terminal unit and the destination terminal unit; used in the call waiting processing system further includes reservation control means for registering an accepted originating reservation call together with a communication period for the originating reservation call and an originating time after a waiting period for the originating reservation call informed by the destination terminal unit when a call setting reservation from the call setting reserving means is accepted by the destination terminal unit, and for registering a received destination reservation call together with a communication period for the destination reservation call notified from said another terminal unit and a destination time after a waiting period by the one terminal unit for the destination reservation call calculated by the waiting period calculating means when the reservation accepting means accepts the call setting reservation from the another terminal unit.

Furthermore, in the terminal unit used in the call waiting processing system of the invention, the waiting period calculating means includes final call process completion time calculating means for calculating a final call process completion time which comes after a communication period registered for the originating reservation call or the destination reservation call from an originating time or a destination time registered in the reservation control means, regarding an originating reservation call or a destination reservation call finally reserved and accepted; and time difference calculating means for calculating, as a waiting period, the time difference between a final call process completion time, calculated by the final call process completion time calculating means, and a present time.

According to the present invention, the originating/destination terminal unit used in the call waiting processing system further includes reservation call setting requesting means for requesting the originating reservation call setting to the destination terminal unit which has accepted the originating reservation call when an originating time of an originating call registered in the reservation control means comes; and reservation call setting means for setting the destination reservation call when another terminal unit reserving the destination reservation call requires the destination reservation call setting after a destination time of a destination reservation call registered in the reservation control means.

In the originating/destination terminal unit used in the call waiting processing system according to the present invention, the call setting reservation means reserves a call setting after a waiting period of the one terminal unit calculated by the waiting time calculating means to the destination terminal unit when said one terminal unit is in a call setting unavailable state at the time of calling, and the reservation control means registers the accepted originating reservation call together with a communication period of the originating reservation call and an originating time after the waiting period of the one terminal, calculated by the waiting period calculating means when the destination terminal unit has received the call setting reservation from the call setting reserving means.

As described above, in the call waiting processing system, and the originating terminal unit, the destination terminal unit, and the terminal unit which can have both functions as described above, the present invention provides that if a call setting request from an originating terminal unit to a destination terminal unit fails since the destination terminal unit is in a busy state, a waiting period, by the time when the destination terminal unit is in a call setting available state, is notified to the originating terminal unit. Thus the originating terminal unit recognizes that a call setting request can be retried after a lapse of a waiting time while it is unnecessary to try to make repeatedly the call setting to the destination terminal unit.

Therefore, a call setting request retried after a waiting period makes it possible to omit unnecessary repeated call setting requests, whereby the ineffective load on the terminals and communication networks including the same can be reduced.

Since the originating terminal unit, to which a waiting period is notified, can reserve a call setting to a destination terminal unit after a lapse of the waiting period, a call setting to the destination terminal unit can be more certainly established after the waiting period.

Furthermore, since at the time of reservation a reserved call setting is automatically requested, a call setting is automatically obtained after a lapse of the waiting period so that no ineffective call setting requests would be necessary. As a result, the ineffective load on the terminal units and communication networks including the same can be further reduced.

Moreover, provided that the terminal unit coupled to or provided in the system is in a busy state or in a call setting unavailable state when a call setting request is made from another terminal unit to that terminal unit, the reservation of a call setting to the destination unit can be accepted after a waiting period at that terminal unit. Therefore a call setting from another terminal unit can be established certainly after a waiting period at that terminal unit by waiting for a destination call from another terminal unit at a reserved destination time.

DESCRIPTION OF THE PREFERRED EMBODIMENTS

Referring to the attached drawings, an explanation will be made in detail as of a preferred embodiment of the call waiting processing terminal unit according to the present invention.

(a) Explanation of the First Embodiment

Figure 1:
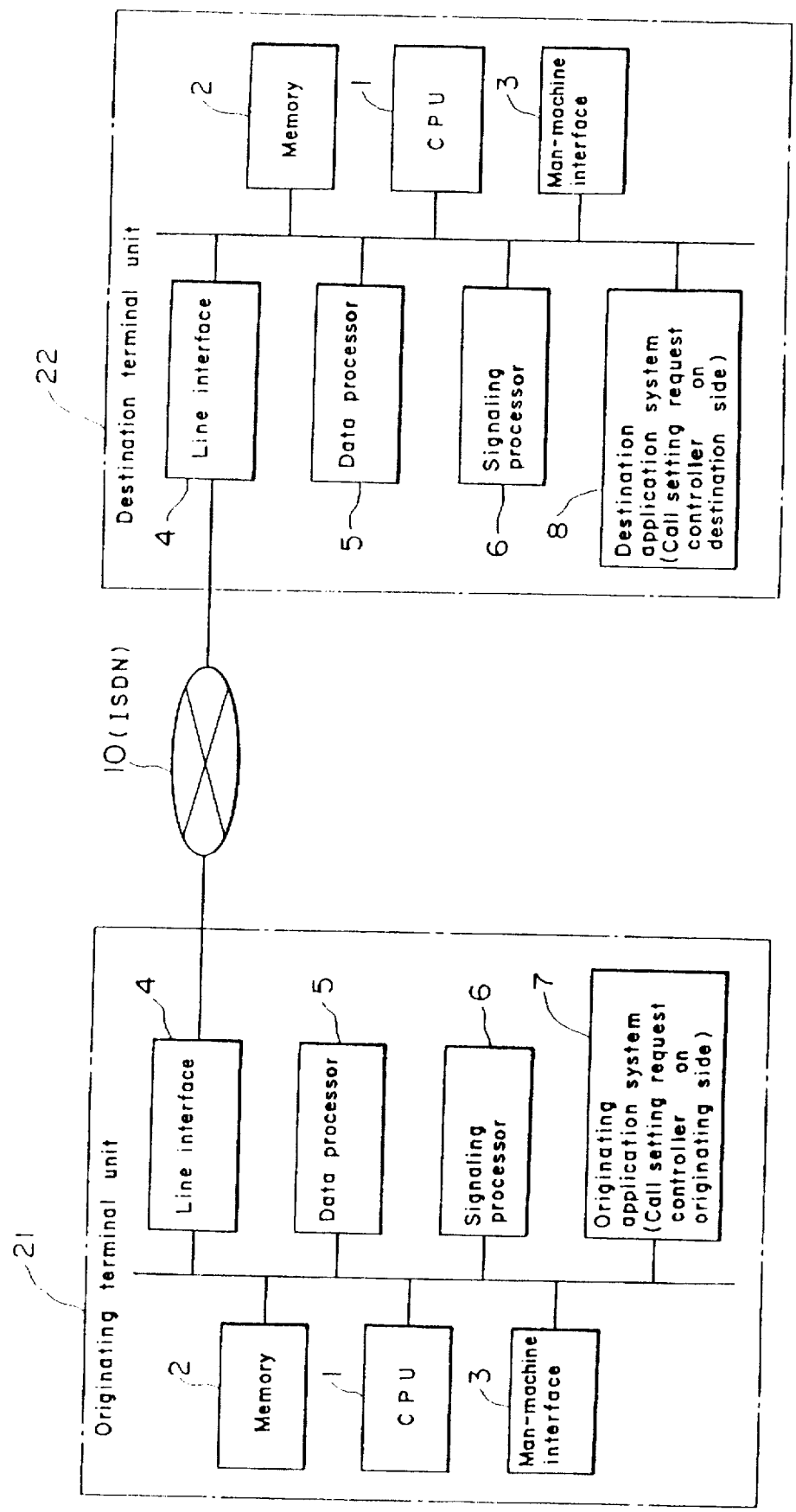
FIG. 1 is a block diagram showing a first embodiment according to the present invention.

FIG. 1 is a block diagram showing the first embodiment according to the present invention. Referring to FIG. 1, numeral 10 represents an ISDN network, and 21 and 22 represent an originating terminal unit and a destination terminal unit included in the ISDN network 10, respectively. According to the present embodiment, an explanation will be made below as for the case that the originating terminal unit 21 operates as a terminal unit on the side of an outgoing call and the destination terminal unit 22 operates as a terminal unit on the side of an incoming call.

As shown in FIG. 1, terminal units 21 and 22 have basically a similar structure. The terminal units each have a CPU 1, a memory 2, a man-machine interface unit 3, such as a keyboard and a touch panel, for interfacing with outside devices, a line interface unit 4 connected to the ISDN network 10 for performing data conversion, such as optical-to-electrical conversion (O/E) or/and electrical-to-optical conversion (E/O) according to a line interface, a data processing unit 5 for performing data assembly and disassembly according to line interface, and A signaling processing unit 6 for performing call setting and call canceling based on a reservation request, a reservation acceptance, or the like, which are realized by application systems 7 and 8, described below.

The originating terminal unit 21 includes the originating application system (originating call setting request control unit) 7 for realizing a characteristic originating function of the present invention. The destination terminal unit 22 includes the destination application system (destination call setting request control unit) 8 for realizing a characteristic destination function of the present invention.

Figure 2:
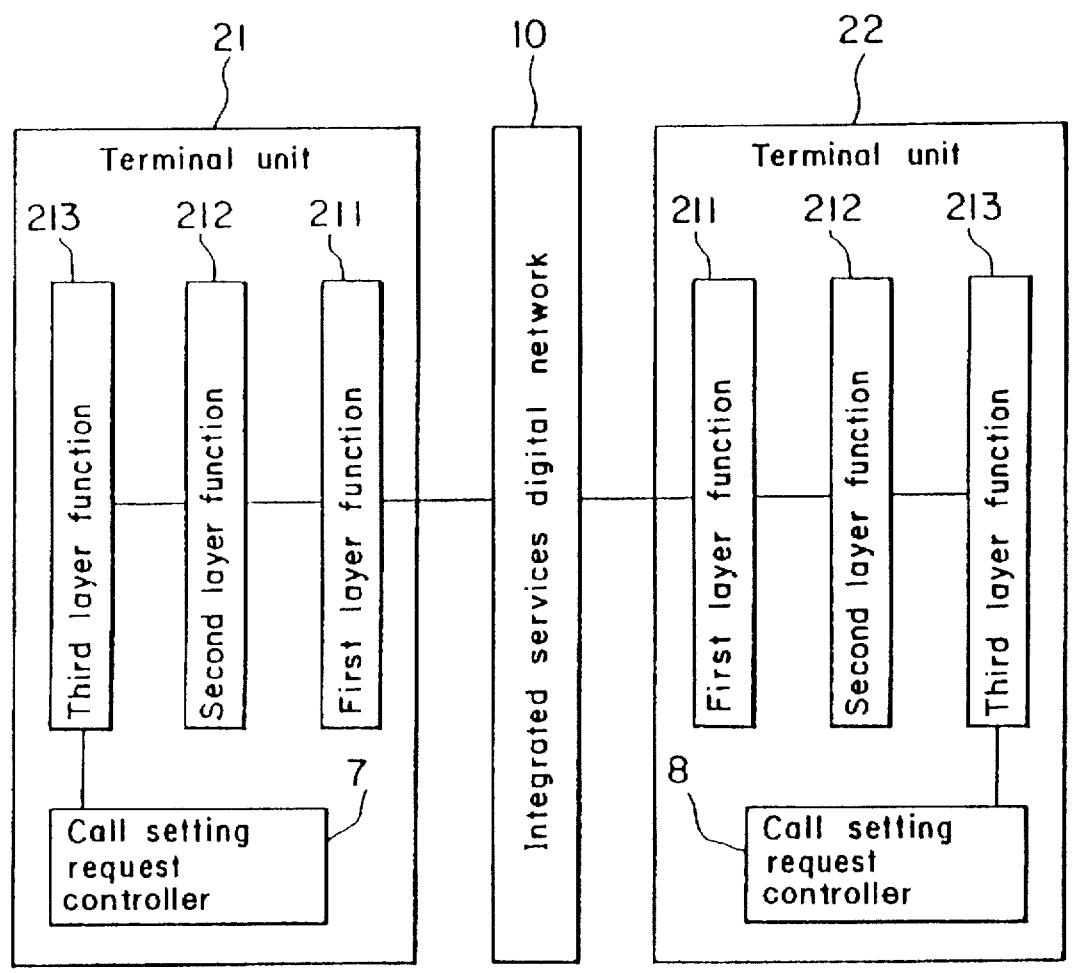
FIG. 2 is a block diagram showing the functional configuration of the first embodiment according to the present invention.

FIG. 2 shows the functional elements of the system shown in FIG. 1. As shown in FIG. 2, like the conventional terminal, the terminal units 21 and 22 each includes the first layer function unit 211, the second layer function unit 212, and the third layer function unit 212, and the third layer function unit 213. An originating call setting request control unit 7 corresponding to the originating application system 7 of FIG. 1 is added to the third layer function unit 213 in the originating terminal unit 21. A destination call setting request control unit 8 corresponding to the destination application system 8 of FIG. 1 is added to the third layer function unit 213 in the destination terminal unit 22.

Next, the constructions of the originating application system (originating call setting request control unit) 7 and the destination application system (destination call setting request control unit) 8 will be respectively explained in detail with reference to FIGS. 3 and 4.

Figure 3:
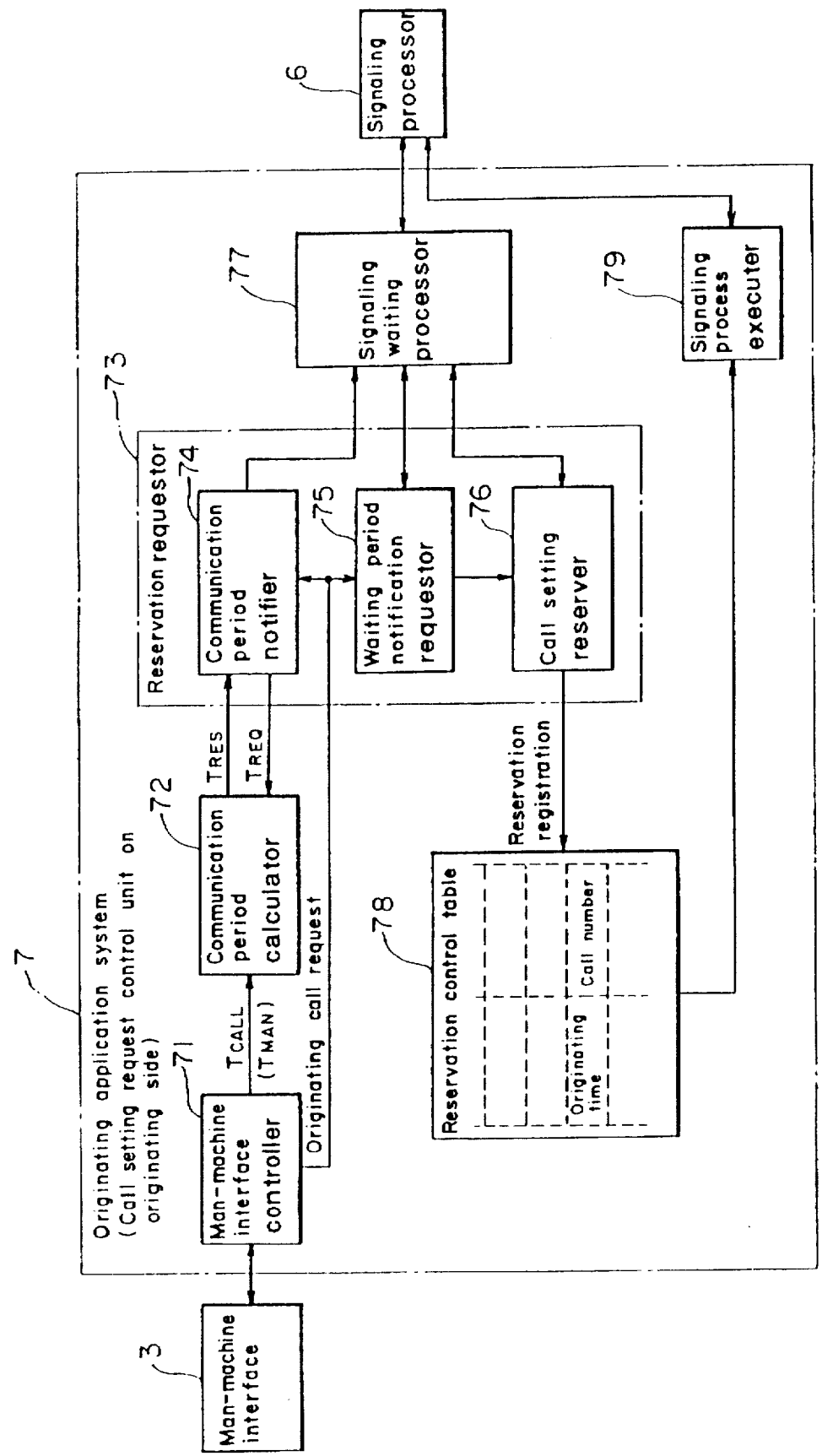
FIG. 3 is a block diagram showing a detail functional configuration of a call setting request control unit in an originating terminal unit according to the first embodiment of the present invention.

FIG. 3 is a block diagram showing a detail functional configuration of the originating application system (originating call setting request control unit) 7 in the originating terminal unit 21. As shown in FIG. 3, the originating application system (destination call setting request control unit) 7 is consisted of a man-machine interface control unit 71, a communication period calculating unit 72, reservation request unit 73, a signaling waiting processing unit 77, a reservation control table 78, and a signaling process executing unit 79.

The man-machine interface control unit 71 controls an operation of the originating application system (originating call setting request control unit) 7 based on data inputted (such as a substantial communication period Tman in a television telephone, and a transmission data amount Tcall in data transmission) manually from the man-machine interface unit 3 by an operator or based on a command such as a call request.

The communication period calculating unit 72 calculates a communication period needed for outgoing call based on data and line information (such as data transmission capacity of a line, or line rate) sent from the man-machine interface control unit 71 when the man-machine interface unit 3 requests a call setting (from the originating terminal unit 21).

The communication period calculating unit 72 calculates a communication period in accordance with both a transmission data amount Tcall and a line rate when it receives the transmission data amount Tcall. However, when a substantial communication period Tman is inputted, it is sent out without any conversion. In order to calculate the communication period, a period may be added to the communication period calculated based on the transmission data amount Tcall and the line rate and the substantial communication period Tman, to allow a margin before and after a calling processing.

The reservation request unit 73 is consisted of a communication period notifying unit 74, a waiting period notification requesting unit 75, and a call setting reserving unit 76.

When the communication period notifying unit 74 receives a calling request from the man-machine interface control unit 71, it sends a request for a communication period to the communication period calculating unit 72 in response to a signal Treq and then notifies the destination terminal unit 22 of the response value (the calculated communication period) Tres. When the destination terminal unit 22 is in an unacceptable state to a call setting, the waiting period notification request unit 75 requests a notification of the waiting period Twait for a call setting acceptance to the destination terminal unit 22.

When notified of a waiting period Twait from the destination terminal unit 22 in accordance with a communication request of a waiting period Twait from the waiting period notification requesting unit 75 (or a release completion message including a waiting period is transmitted from the destination terminal unit 22) and when a reservation is available to a destination side, the call setting reserving unit 76 issues a reservation request to the signaling waiting processing unit 77 so as to reserve a call setting after a lapse of the notified waiting period Twait to the destination terminal unit 22, and then registers the reservation call in the reservation control table 78.

When the originating terminal unit 21 is communicating with another terminal unit and in a call setting unavailable state (or a communication standby state), the signaling waiting processing unit 77 basically controls a reservation request signal output from the reservation request unit 73 to the signaling processing unit 6 while it controls the reservation acceptance signal input from the destination terminal unit 22 to the reservation request unit 73 via the signaling processing unit 6.

The reservation control table (reservation control unit) 78, when a call setting reservation from the call setting reserving unit 76 is received by the destination terminal unit 22, registers the accepted reservation call. The call number (information regarding the originating terminal unit 22), and an originating time (absolute time) which is a time passed from a present time by a waiting period Twait for a reservation call informed from the destination terminal unit 22, are registered by the call setting reserving unit 76. When the registered originating time comes, the reservation control table 78 hands the originating processing command to the signaling process executing unit 79 and then cancels the reservation registration of the calling process.

When an originating time of the reserved call registered in the reservation control table 78 comes, the signaling process executing unit (reservation call setting requesting unit) 79 receives an originating process command from the reservation control table 78, and then requests the reserved call setting with respect to the destination terminal unit 22 accepting the reservation call.

Figure 4:
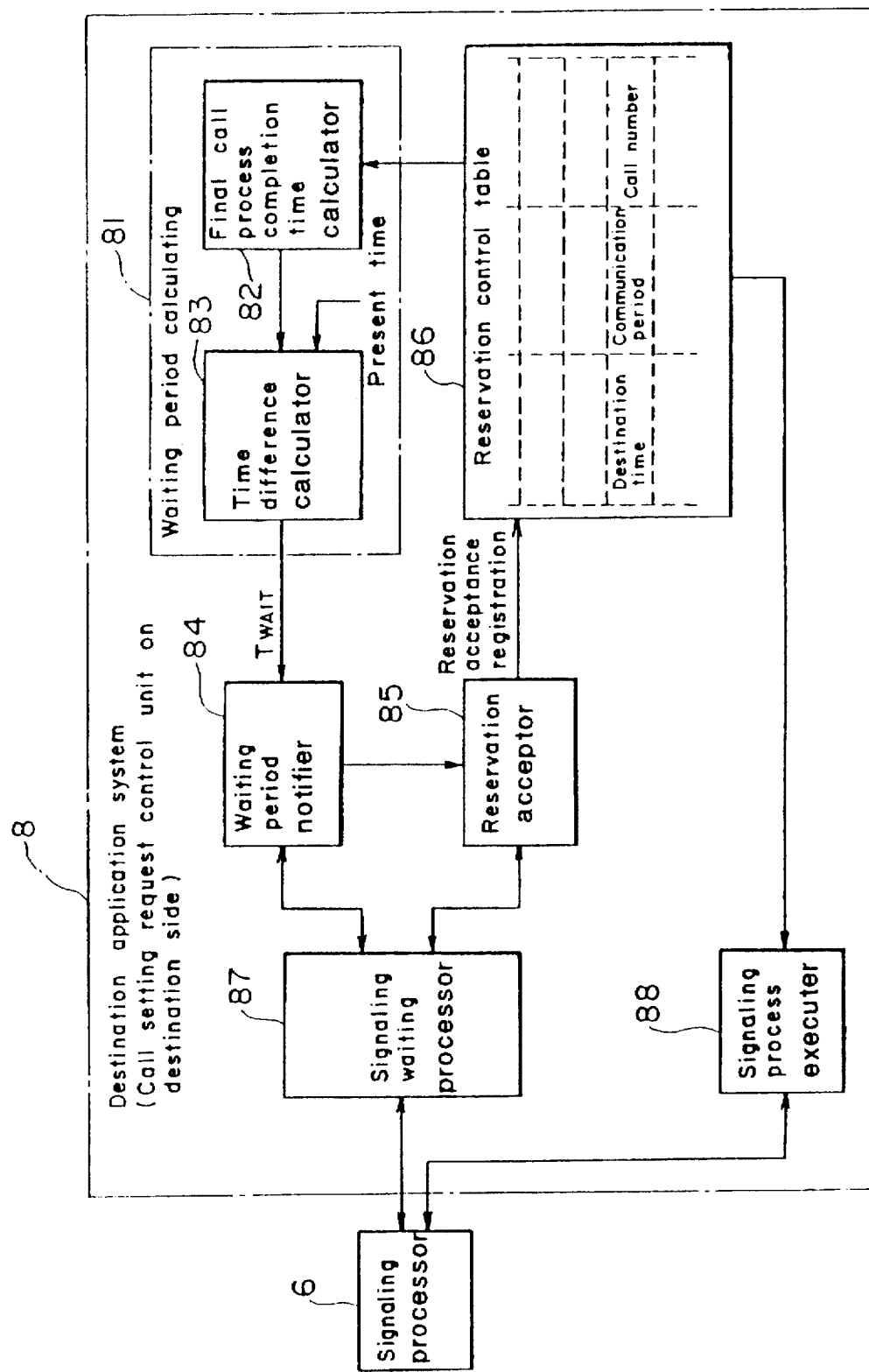
FIG. 4 is a block diagram showing a detail functional configuration of a call setting request control unit in a destination terminal unit according to the first embodiment of the present invention.

FIG. 4 is a block diagram showing a detail functional construction of the destination application system 8 (destination call setting request control unit) in the destination terminal unit 22. The destination application system 8 (destination call setting request control unit), as shown in FIG. 4, is consisted of a waiting period calculating unit 81, a waiting period notifying unit 84, a reservation accepting unit 85, a reservation control table 86, a signaling waiting processing unit 87, and a signaling process executing unit 88.

When the terminal unit 22 is in a call setting unavailable state, the waiting period calculating unit 81 calculates a waiting period Twait for a call setting available state based an the data registered in the reservation control table 86, as will be described later.

Upon a destination call from the originating terminal unit 21, when the destination terminal unit 22 is communicating with another terminal unit and is in a call setting unavailable state, the waiting period notifying unit 84 receives a call setting message including a waiting period notification request and the communication period thereof from the signaling waiting processing unit 87, so that the waiting period notifying unit 84 sends a request to the signaling waiting processing unit 87 to notify the originating terminal unit 21 of the waiting period Twait calculated by the waiting period calculating unit 81 combined with a release completion message.

When a call setting reservation is requested without any trouble after a lapse of the waiting period Twait from the originating terminal unit 21 which has notified of a waiting period Twait through the waiting period notifying unit 84, the reservation accepting unit 85 sends a request to the signaling waiting processing unit 87 to notify the originating terminal unit 21 of the call setting reservation acceptance, and registers the reservation call in the reservation control table 86.

When the call accepting unit 85 accepts a call setting reservation from originating terminal unit 21, the reservation control table (reservation control means) 86 registers a received reserved call. The call number (information regarding the originating terminal unit 21), a destination time (absolute time) which is a time passed from a present time by a waiting period Twait calculated by the waiting period calculating unit 81, and a communication period for the reservation call notified from the originating terminal unit 21 are registered through the reservation accepting unit 85. When a registered destination time comes, the reservation control table 86 also provides the destination processing command to the signaling process executing unit 88, and then cancels the reservation registration of the calling process.

The waiting time calculating unit 81 is constituted of a final call process completion time calculating unit 82 for calculating a final call process completion time after a time passed from the destination time of a finally reserved call registered in the reservation control table 86 by the registered communication period for the reserved call, and a time difference calculating unit 83 for calculating, as a waiting period Twait, the time difference between the final call process completion time calculated by the final call process completion time calculating unit 82 and a present time.

The signaling waiting processing unit 87, when the destination terminal unit 22 is communicating with another terminal unit and is in a call setting unavailable state (in the case of a communication waiting state), basically controls so as to output reservation accepting signals from the waiting period notifying unit 84 and the reservation accepting unit 85 to the signaling processing unit 6 and to input a reservation request signal from the originating terminal unit 21 through the signaling processing unit 6, to the waiting period notifying unit 84 and the reservation accepting unit 85.

The signaling process executing unit (reservation call setting means) 88 receives a destination processing command from the reservation control table 86 after the destination time of a reservation call registered in the reservation control table 86, waits for a fixed period to receive a reservation call setting requested from the originating terminal unit 21 which has reserved the reserved call setting, and sets the reservation call when requested. When the originating terminal unit 21 does not request a reservation call setting after a lapse of a fixed period, the reservation call registered in the reservation control table 86 is canceled.

Figure 5:
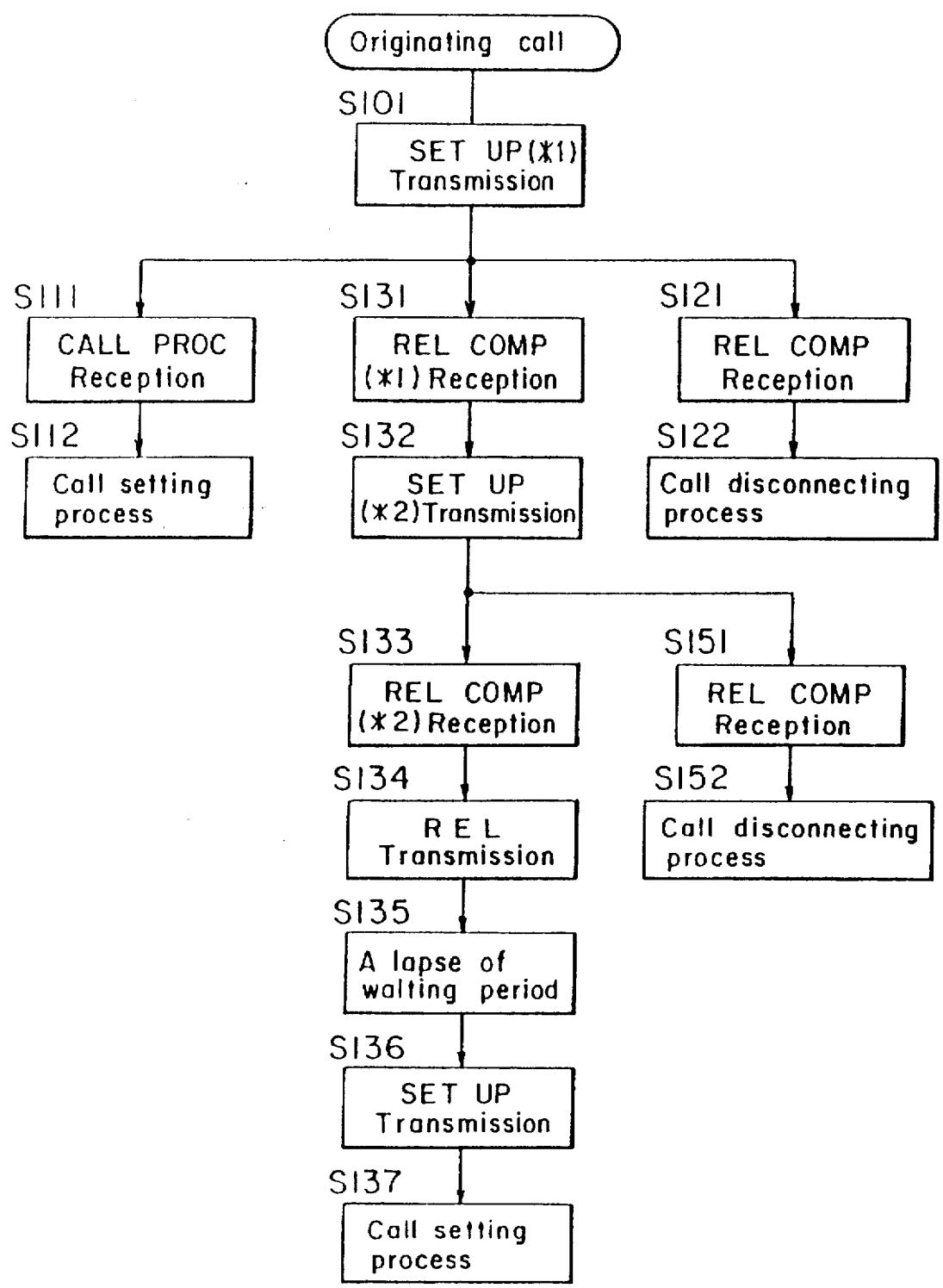
FIG. 5 is a diagram showing an example of processing steps of the originating terminal unit (or a terminal unit on a call originating side) according to the first embodiment of the present invention.
Figure 6:
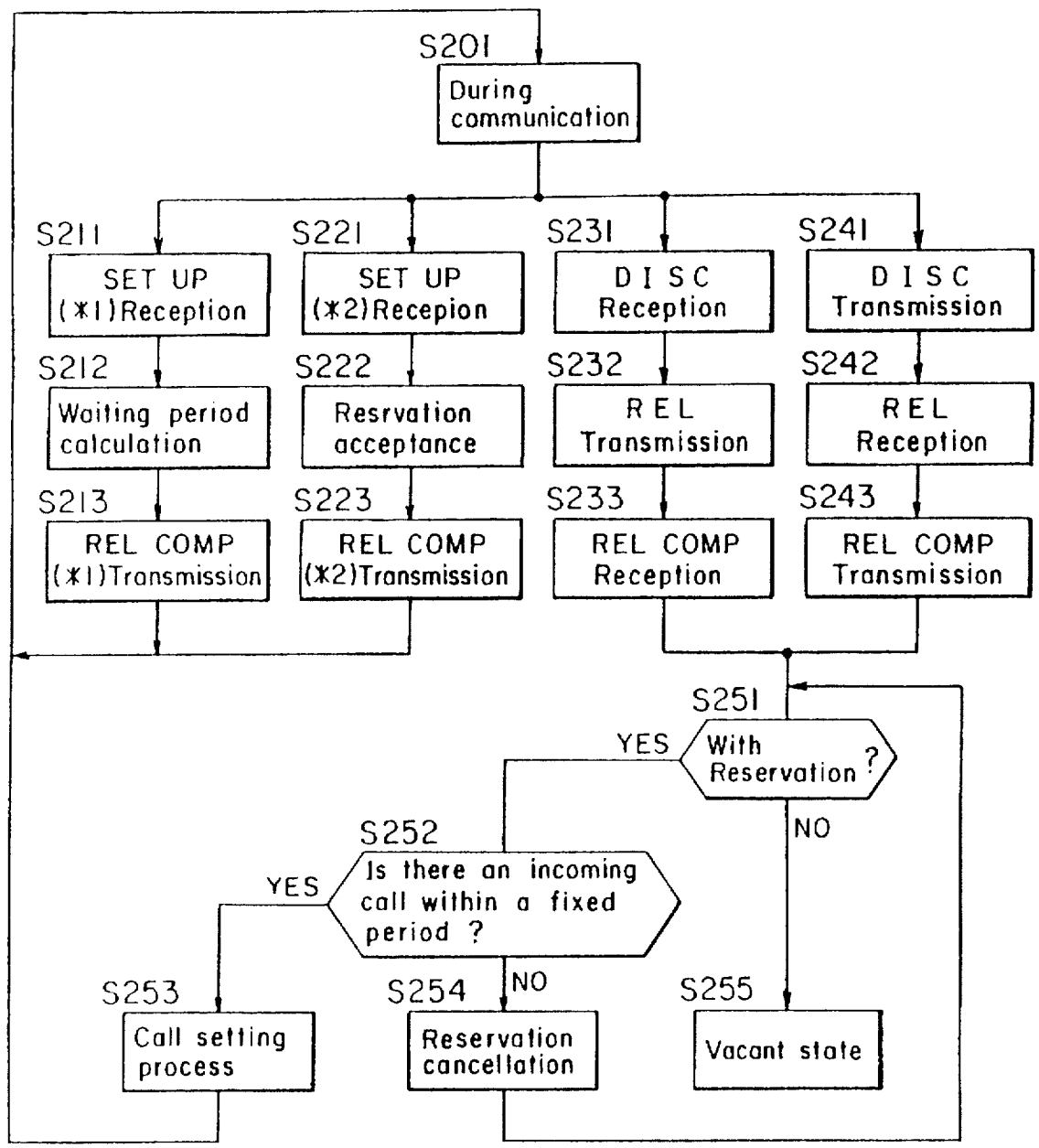
FIG. 6 is a diagram showing an example of the processing steps of the destination terminal unit (or a terminal unit on a call destination side) according to the first embodiment of the present invention.
Figure 7:
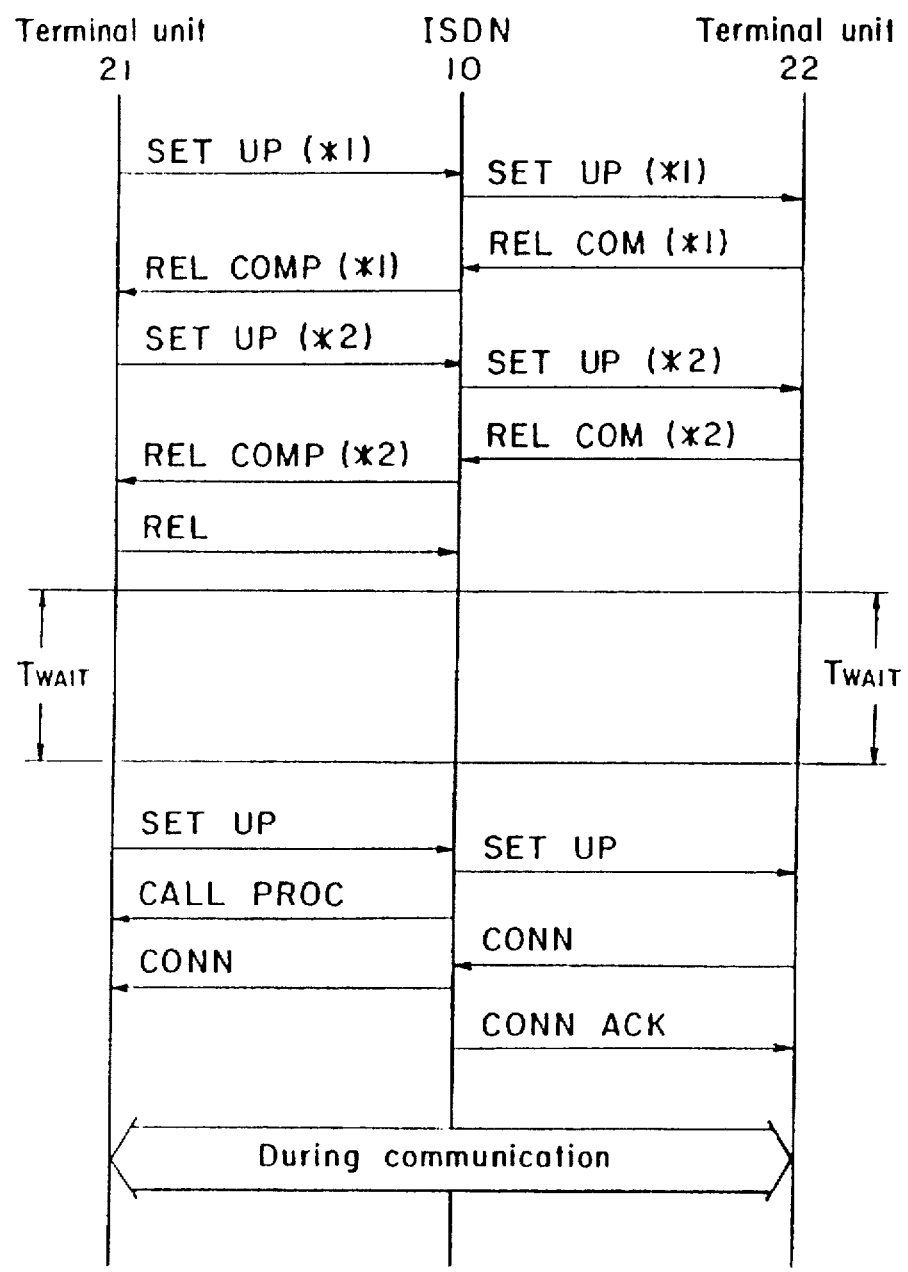
FIG. 7 is a diagram showing an example of a call setting process according to the first embodiment of the present invention.

The operation of the originating terminal unit 21 and destination unit 22 according to the first embodiment of the present invention will be explained in concrete referring to FIGS. 5 through 7. FIG. 5 is a diagram showing an example of the processing steps of the originating terminal unit (or a terminal unit on the call originating side) 21. FIG. 6 is a diagram showing an example of the processing steps of the destination terminal unit (or a terminal unit on the call destination side) 22. FIG. 7 is a diagram showing a sequence of signals which are exchanged mutually between the terminal units 21 and 22 and the ISDN network 10 in call setting step.

When the terminal unit 21 requests a communication with another terminal unit 22 via the ISDN network 10, it receives a calling request from the man-machine interface unit 3 in the terminal unit 21, and activates the communication period calculating unit 72, the communication period notifying unit 74, and the waiting period notification request unit 75 which are included in the originating application system 7 (originating call setting request control unit) within the terminal unit 21.

The communication period calculating unit 72 activated calculates a communication period for the calling based on the transmission data amount Tcall and the line rate when a transmission data amount Tcall is inputted from the man-machine interface unit 3 with a calling request. Upon a calling request, the communication period notifying unit 74 requests a communication period for the calling to the communication period calculating unit 72 in response to the signal Treq, and prepares an information factor notifying the communication period to transmit it to the signaling waiting processing unit 77 and the signaling processing unit 6.

At the same time, when the terminal unit 22 is under communication and in a call setting unavailable state, the waiting period notifying request unit 75 prepares an information factor requesting a notification of waiting period Twait for a call setting available state, and transmits it to the signaling waiting processing unit 77 and the signaling processing unit 6.

The signaling processing unit 6 prepares a call setting message SETUP (*1) including the two information factors transmitted from the originating application system 7, and then transmits it to the terminal unit 22 via the ISDN network 10, as shown in FIG. 7 (step S101 in FIG. 5).

At the time when the call setting message SETUP (*1) has been received, if the destination terminal unit 22 is in a call setting available state, the originating terminal unit 21 also executes a call setting process in a well-known order since the terminal unit 22 executes the call setting process in a well-known order (steps S111 and S112 in FIG. 5).

When the terminal unit 22 receives a call setting message SETUP (*1) from the terminal unit 21 (step S211 in FIG. 6) during communication to another terminal unit (step S201 in FIG. 6), it analyzes the received call setting message SETUP (*1). When an information factor requesting a notification of the waiting period Twait is recognized, the terminal unit 22 activates the waiting period calculating unit 81 and the waiting period notifying unit 84 in the destination application system 8 (destination call setting request control unit).

In the waiting period calculating unit 81 activated, the final call process completion time calculating unit 82 calculates a final call process completion time being a time passed by the registered communication period from the destination time of a final reserved call registered in the reservation control table 86. Moreover the calculating unit 83 calculates the time difference between the final call process completion time calculated in the final call process completion time calculating unit 82 and a present time can be set as a waiting period Twait until the call requested by the call setting message SETUP (*1) can be set.

The waiting period notifying unit 84 prepares an information factor for notifying the originating terminal unit 21 of the calculated waiting period Twait to transmit it to the signaling waiting processing unit 87 and the signaling processing unit 6 (step S212 in FIG. 6). In order to notify the originating terminal unit 21 of that the self terminal unit 22 is under communication and in a call setting unavailable state, the signaling processing unit 6 prepares a release completion message REL COM (*1) including the information factor transmitted from the destination application system 8 and then transmits it to the originating terminal unit 21 via the ISDN network 10, as shown in FIG. 7 (step S213 in FIG. 6).

The originating terminal unit 21 receives a release completion message REL COMP (*1) from the destination terminal unit 22 (step S131 in FIG. 5), to analyze it. When it is recognized that the message includes an information factor for notifying the waiting period Twait, the call setting reserving unit 76 in the originating application system 7 is activated (step S131 in FIG. 5).

When the call setting reserving unit 76 activated recognizes that the destination terminal unit 22 is in a call setting unavailable state but will be in a call setting available state after a lapse of a waiting period Twait by analyzing the information factor, it prepares an information factor for reserving a call setting to the originating terminal unit 21 after a lapse of the waiting period Twait to the destination terminal unit 22, to transmit it to the signaling waiting processing unit 77 and the signaling processing unit 6. The signaling processing unit 6 prepares a call setting message SETUP (*2) including the information factor transmitted from the originating application system 7, and then transmits to the destination terminal unit 22 via the ISDN network 10, as shown in FIG. 7 (step S132 in FIG. 5).

The destination terminal unit 22 receives a call setting message SETUP (*2) from the originating terminal unit 21 under communications (step S201 in FIG. 6) to analyze it (step S221 in FIG. 6). When it is recognized that the message includes an information factor for reserving a call setting after a lapse of waiting period Twait, the reservation accepting unit 85 in the destination application system 8 is activated.

When the reservation accepting unit 85 activated recognizes that the originating terminal unit 21 has reserved a call setting after a lapse of a waiting period Twait by analyzing the information factor, it accepts a reservation of a call setting for the originating terminal unit 21 after a lapse of a waiting period Twait. When the reservation control table 86 registers the call number (information regarding the originating terminal unit 21), the destination time (absolute time) being a time passed from a present time by the waiting period Twait calculated by the waiting period calculating unit 81, and a communication period for the reserved call informed from the originating terminal unit 21 (step S222 in FIG. 6), the reservation accepting unit 85 prepares the information factor notifying the acceptance of a call setting reservation after a lapse of waiting period Twait, to transmit it to the signaling waiting processing unit 87 and the signaling processing unit 6. The signaling processing unit 6 prepares a release completion message REL COMP (*2) including the information factor sent from the destination application system 8 to transmit it to the originating terminal unit 21 via the ISDf4 network 10, as shown in FIG. 7 (step S223 in FIG. 6).

The originating terminal unit 21 receives the release completion message REL COMP (*2) from the destination terminal unit 22 (step S133 in FIG. 5) and analyzes it. Then the destination terminal unit 22 recognizes that the message includes the information factor notifying a reservation acceptance for a call setting, it transmits the release message REL to the ISDN network 10 as shown in FIG. 7 (step S134 in FIG. 5) while the call setting reserving unit 76 in the originating application system 7 is activated.

When the call setting reserving unit 76 activated recognizes that the destination terminal unit 22 has accepted a reservation of a call setting for the originating terminal unit 21 after a lapse of a waiting period Twait by analyzing the information factor, the call setting has been reserved to the terminal unit 22 after a lapse of waiting period Twait. Then the reservation control table 78 registers the call number (information regarding the originating terminal unit 22) and the originating time (absolute time) which is a time passed from the present time by a waiting period Twait for the reserved call notified from the destination terminal unit 22.

Then, when the originating application system 7 monitors an originating time registered in the reservation control table 78 and recognizes that the originating time for the reserved call setting has come (or the waiting period Twait has passed) (stop S135 in FIG. 5), the originating command is notified to the signaling process executing unit 79. Then the signaling processing unit 6 prepares the call setting message SETUP requesting a call setting with respect to the destination terminal unit 22 and transmits it to the destination terminal unit 22 via the ISDN network 10, as shown in FIG. 7 (step S136 in FIG. 5).

When the destination terminal unit 22 completes a continuing communication and then receives a disconnecting message DISC transmitted via the ISDN network 10 from another terminal unit or a communication partner (step S231 in FIG. 6), or transmits a disconnecting message DISC to another terminal unit or a communication partner from the self terminal unit 22 via the ISDN network 10 (step S241 in FIG. 6), a call disconnecting process is performed to another terminal unit or the communication partner in a well-known order (steps S231 to S233 or S241 to S243 in FIG. 6) while the signaling process executing unit 88 in the destination application system 8 is activated.

The signaling process executing unit 88 activated analyzes the presence/absence of a reserved call setting by referring the reservation control table 86 (step S251 in FIG. 6). If the signaling process executing unit 88 recognizes the presence of a reserved call setting, it waits for whether an outgoing call from the originating terminal unit 21 to the destination terminal unit 22 is present within a fixed period from the registered destination time (step S252 in FIG. 6). When the signaling process executing unit 88 receives a call setting message SETUP and recognizes an arrival of the outgoing call from the terminal unit 21 to the destination terminal unit 22 on standby, it makes the signaling processing unit 6 to perform a call setting process in a well-known order, and sets a reserved call between the originating terminal unit 21 and the destination terminal unit 22, as shown in FIG. 7, thus executing desired communications (step S137 in FIG. 5 and step S253 in FIG. 6).

When the originating terminal unit 21 has not sent a destination call within a reserved period, the destination terminal unit 22 recognizes that a reserved call setting has not been requested to the destination terminal unit 22, thus canceling the call setting from the reservation control table 86.

As described above, the destination application system 8 (destination call setting request control unit) in the destination terminal unit 22 changes to a vacant state (step S255 in FIG. 6), when the reserved and registered call setting requests are processed or canceled sequentially while all reserved call setting requests are removed (step S251 in FIG. 6).

Provided that the destination terminal unit 22 is in a call setting unavailable state and does not have the destination application system (destination call setting request control unit) 8, when the originating terminal unit 21 transmits the call setting message SETUP (*1), the originating terminal unit 21 performs a call disconnecting process like the conventional one since the release completion message REL COMP including no information factor for informing a waiting period Twait is returned (steps S121 and 122 in FIG. 5).

Provided that some factors prevent the destination terminal unit 22 from reserving a call setting after a lapse of a waiting period Twait, thus returning a release completion message REL COMP including no information factor notifying a call setting reservation acceptance, the originating terminal unit 21 performs a call disconnecting process like the conventional one (steps S151 and S152 in FIG. 5) when it transmits the call setting message SETUP (*2).

As is clear from the above explanation, according to the first embodiment of the present invention, even if the terminal unit 21 cannot accept a call setting because the terminal unit 22 is in a busy state, the terminal unit 21 can recognize that retrying a call setting request after a lapse of a waiting period Twait recovers the inconvenience because the terminal unit 22 notifies the terminal unit 21 of the waiting period Twait for an available call setting. Therefore it is unnecessary to repeat call setting requests to the terminal unit 22.

The terminal unit 21 which has been notified of a waiting period Twait can reserve a call setting after a lapse of the waiting period Twait with respect to the terminal unit 22, thus making the call setting after a lapse of the waiting period Twait more reliable.

(b) Explanation of the Second Embodiment

Figure 8:
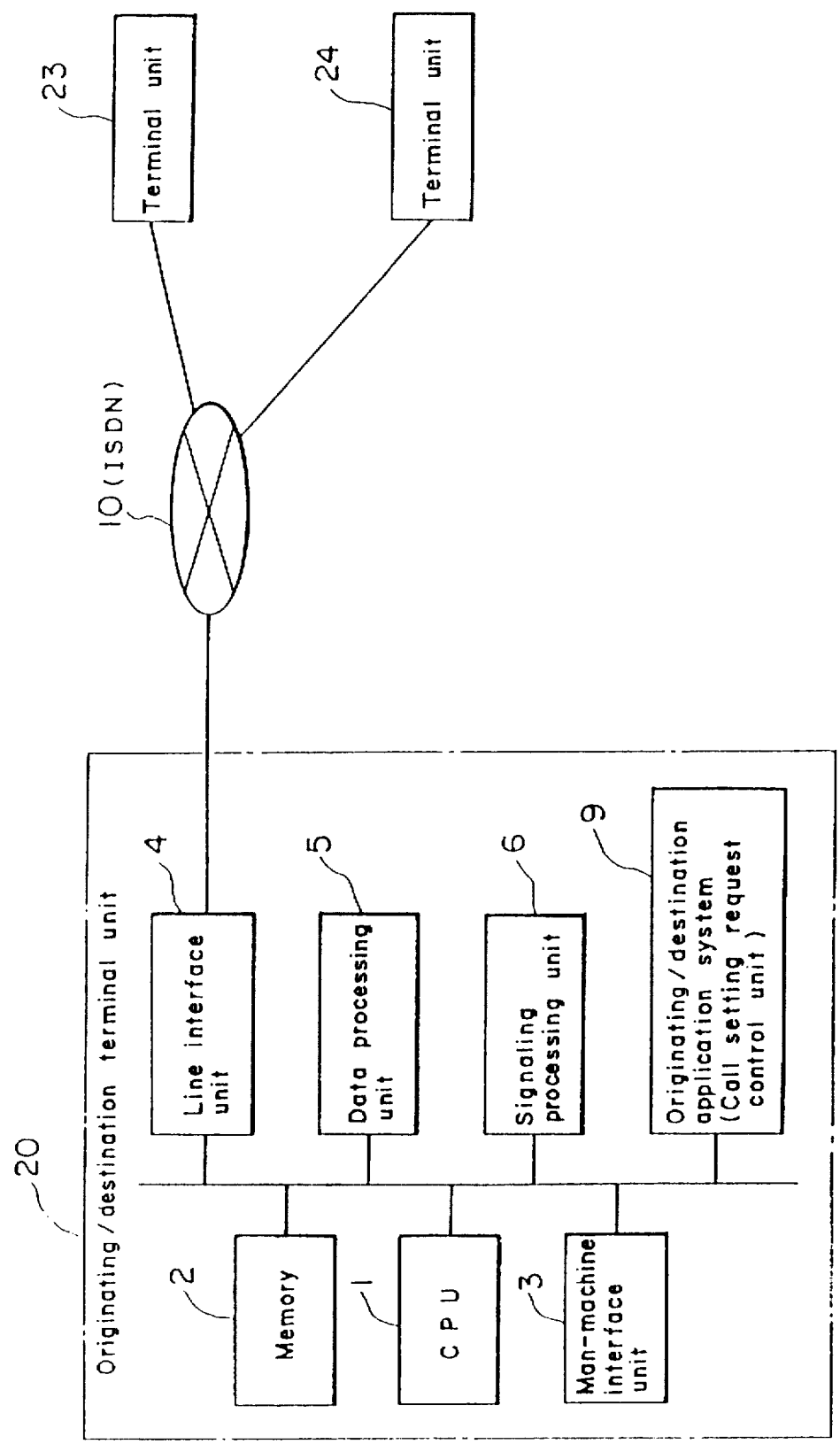
FIG. 8 is a block diagram showing the second embodiment of the present invention.
Figure 9:
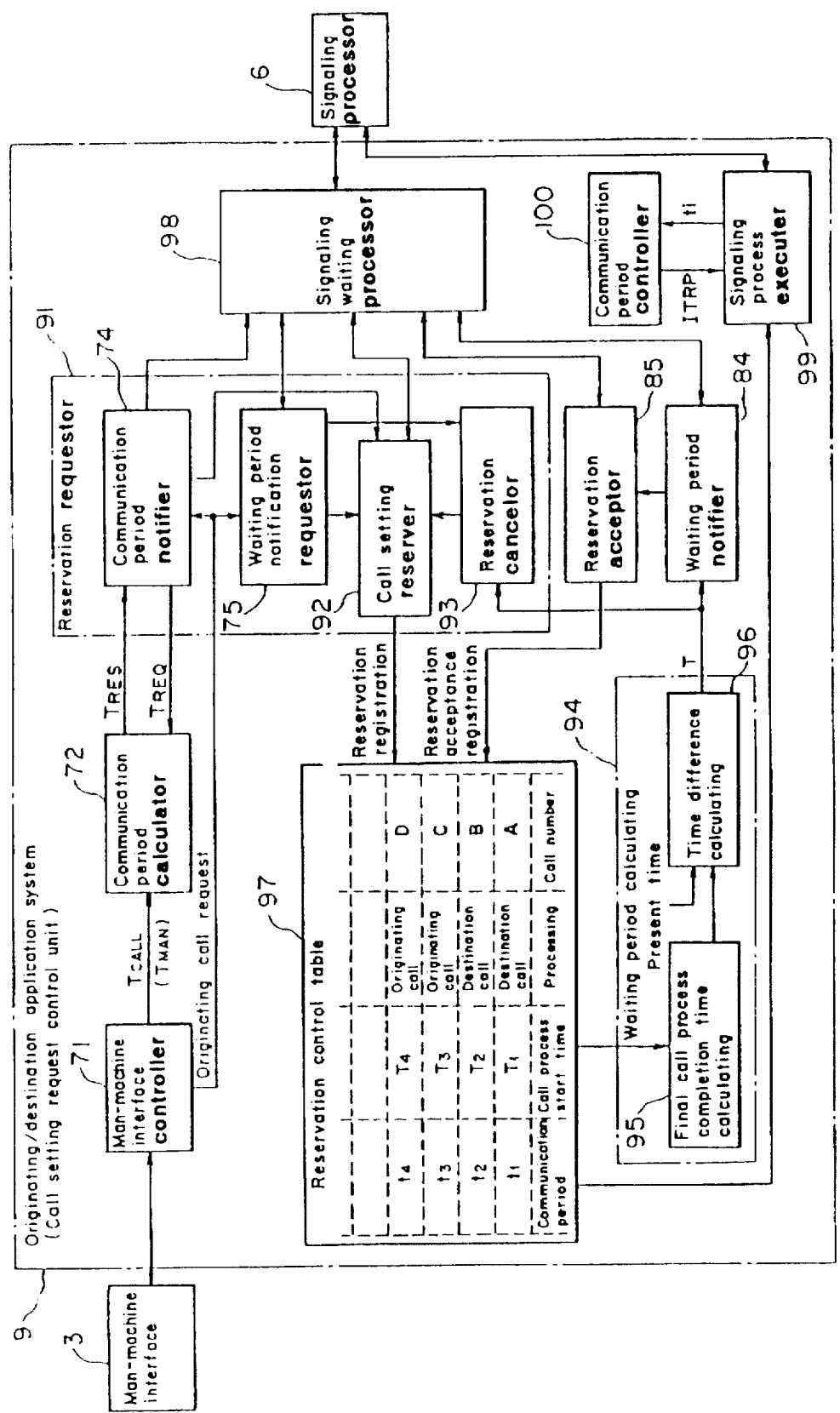
FIG. 9 is a block diagram showing in detail the main configuration of an originating/destination terminal unit which can have the function of the originating terminal unit and the function of the destination terminal unit, according to the second embodiment of the present invention.

FIG. 8 is a block diagram showing the second embodiment according to the present invention. FIG. 9 is a block diagram showing in detail the main configuration of the originating/destination terminal unit according to the second embodiment of the present invention. The originating/destination terminal unit 20 according to the second embodiment shown in FIGS. 8 and 9 has a combined function of the originating terminal unit 21 and the destination terminal unit 22 described in connection with the first embodiment and is therefore called originating/destination terminal unit. Hence like numerals are affixed to like functional portions. In FIG. 8, since the ISDN network 10 includes the terminals units 20, 23 and 24 and the terminal units 23 and 24 each have a configuration similar to that of the terminal unit 20, the detail configurations thereof are omitted in FIG. 8.

As shown in FIG. 8, the originating/destination terminal unit 20 of the second embodiment is constituted of a CPU 1, a memory 2, a man-machine interface unit 3, a line interface unit 4, a data processing unit 5, and a signaling processing unit 6, basically in the substantially same manner as the terminal units 21 and 22 of the first embodiment. The originating/destination terminal unit 20 also includes an originating/destination application system (call setting request control unit) 9 to realize the characteristic originating function of the present invention.

Next an explanation will be made as for the detail configuration of the originating/destination terminal unit (call setting request control unit) 9 with reference to FIG. 9. As shown in FIG. 9, the originating/destination application system 9 is constituted of a man-machine interface control unit 71, a communication period calculating unit 72, a reservation requesting unit 91, a waiting period calculating unit 94, a waiting period notifying unit 84, a reservation accepting unit 85, a reservation control table 97, a signaling waiting processing unit 98, signaling process executing unit 99, and a communication period control unit 100.

Both the man-machine interface control unit 71 and the communication period calculating unit 72 perform totally the same function as those in the first embodiment shown in FIG. 3. Hence the details thereof will be omitted.

The reservation requesting unit 91 is formed of a communication period notifying unit 74, a waiting period notification requesting unit 75, a call setting reserving unit 92, and a reservation canceling unit 93.

Both the communication period notifying unit 74 and the waiting period notification requesting unit 75 perform totally the same function as those in the first embodiment shown in FIG. 3. Hence the details thereof will be omitted.

When the call setting reserving unit 92 is notified of a waiting period Twait by the destination terminal unit 23 in response to a notification request of a waiting period Twait from the waiting period notification requesting unit 75 (or the destination terminal unit 23 transmits a release completion message including a waiting period) and can reserve for the destination side, as if a call setting after a lapse of a notified originating waiting period Twait is reserved to the destination terminal unit 23, the call setting reserving unit 92 issues a reservation request to the signaling waiting processing unit 98 and then registers the reservation call in the reservation control table 97 as described later.

The reservation canceling unit 93 also cancels the reservation for the destination terminal unit 23 issued from the call setting reserving unit 92 when the waiting period Twait notified from the destination terminal unit 23 in response to the waiting period notification request from the waiting period notification requesting unit 75 is shorter than the waiting period T of the self terminal unit calculated by means of the waiting period calculating unit 94.

In the case where the terminal unit 20 is in call setting unavailable state, the waiting period calculating unit 94 calculates a call setting available waiting period T of the terminal unit 20 based on data registered in the reservation control table 97 as will be described later.

In a substantially similar manner to that of the first embodiment, in the case where the terminal unit 20 is in a state of communication and in a call setting unavailable state when an incoming call has come from another terminal unit 24 while a call setting message including a waiting period notification request from the signaling waiting processing unit 98 and the information regarding communication period of the calling has been received, the waiting period notifying unit 84 requests it to the signaling waiting processing means 98 that the waiting period T of the terminal unit 20 calculated by the waiting period calculating unit 94 is notified together with a release completion message to another terminal unit 24.

The reservation accepting unit 85 has substantially the same function as that of the reservation accepting unit of the first embodiment. The reservation accepting unit 85 requests to the signaling waiting processing unit 98 to notify another terminal unit 24 of an acceptance of the call setting reservation and registers the reservation call in the reservation control table 97 when another terminal unit 24 which has notified of a waiting period T of the terminal unit 20 through the waiting period notifying unit 84, requests a call setting reservation after a lapse of the waiting period T without any trouble.

The reservation control table (reservation control means) 97 registers an accepted originating reservation call when the destination terminal unit 23 accepts a call setting reservation from the call setting reserving unit 92, while it registers an accepted destination reservation call when the reservation accepting unit 85 accepts a call setting reservation from another terminal unit 24. For the originating reservation call, a call number (information regarding the destination terminal unit 23), a communication period ti for the originating reservation call calculated by the communication period calculating unit 72, an originating time (absolute time showing originating process start time) Ti after a lapse of a waiting period Twait for an originating reservation call notified from the destination terminal unit 23, and a process content (in this case, originating or outgoing call) are registered. For the destination reservation call, a call number (information regarding another terminal unit 24), a communication period ti for a destination reservation call notified by another terminal unit 24, a destination time (absolute time showing destination process start time) Ti after a lapse of a self terminal waiting period T calculated by means of the waiting time calculating unit 94, and a process content (in this case, destination call) are registered.

The terminal unit 20 according to the second embodiment can call to another terminal unit to set an originating reservation call even if the terminal unit 20 is in the state of communication with another terminal and in a call setting unavailable state. The call setting reserving unit 92 can reserve a call setting after a lapse of a self terminal waiting period T calculated by the waiting period calculating unit 94 to the destination terminal unit 23 when the self terminal unit 20 is in an unavailable state for calling setting.

When the reservation for a call setting from the call setting reserving unit 92 is accepted by the destination terminal unit 23, the call setting reserving unit 92 registers in the reservation control table 97 the accepted originating reservation call together with the call number (information regarding the destination terminal unit 23), the communication period ti for the originating reservation call calculated by the communication period calculating unit 72, the originating time (an absolute time showing the calling process start time) Ti being a time after a lapse of the |self terminal| waiting period T of the terminal unit 20, calculated by the waiting period calculating unit 94, and the processing content (in this case, originating or outgoing call).

The waiting period calculating unit 94 is constituted of final call process completion time calculating unit 95 for calculating a final call process completion time after a period passed from an originating time or a destination time Ti registered in the registration control table 97 by a communication period ti registered for an originating reservation call or the destination reservation call in an originating reservation call or a destination reservation call reserved finally, and time difference calculating unit 96 for calculating as a self terminal waiting period T the time difference between a final call process completion time calculated by the final call process completion time calculating unit 95, and a present time.

The signaling waiting processing unit 98 has the functions of the two signaling waiting processing unit 77 and 87 explained for the first embodiment. Basically, when the terminal unit 20 is during communication with another terminal unit and in a call setting unavailable state (or in a communication waiting state), the reservation request unit 91, the waiting period notification unit 84, and the reservation accepting unit 85 are controlled to transmit a reservation request signal and a reservation accepting signal to the signaling processing unit 6. At the same time, the signaling waiting processing unit 98 controls a reservation request signal and a reservation acceptance signal from the destination terminal unit 23 or another terminal unit 24 received through the signaling processing unit 6 which are input to the reservation requesting unit 91 and the waiting period notifying unit 84, and the reservation accepting unit 85.

The signaling process executing unit (reservation call setting requesting means, reservation call setting means) 99 has the functions of the two signaling process executing units 79 and 88 as explained with the first embodiment. When the originating time of an originating reservation call registered in the reservation control table 97 has come, an originating reservation call setting is requested to the destination terminal unit 23 accepting the originating reservation call in response to the originating processing command from the reservation control table 97. The signaling process executing unit 99 waits for a fixed period a destination reservation call setting requested by the another terminal unit 24 reserving a destination reservation call setting in response to destination processing command from the reservation control table 97 when the destination time of a destination reservation call registered in the reservation control table 97 comes. The signaling process executing unit 99 also sets the reservation call when a reservation call setting is requested. The registration of the reservation call of the reservation control table 97 is cancelled when a destination call setting is not requested from another terminal unit 24 after a lapse of the fixed period.

When the signaling process executing unit 99 performs a calling process handed from the reservation control table 97, the communication period control unit 100 is notified of the communication period ti for the call process registered from the signaling process executing unit 99, monitors the communication period from the call process start time, and interrupts to the signaling process executing unit 99 near to the communication period ti to perform the call releasing request.

The operation of the above described originating/destination terminal unit 20 which can have the function of the originating terminal unit and alternatively the function of the destination terminal unit will be described below.

The fundamental processing step is similar to that of the originating terminal unit 21 and the destination terminal unit 22 of the first embodiment explained in FIGS. 5 and 6. The originating/destination terminal unit 20 according to the present invention executes two kinds of the above mentioned processing steps. The signal sequence communicated between the terminals 20, 23, and 24, and the ISDN network 10 is the same as that in FIG. 7. In the present embodiment, a further explanation will be made below for the case where the terminal unit 20 executes an outgoing call to the terminal unit 23 during communication and the case where the terminal unit 20 receives an incoming call to another terminal unit 24 during communication.

Like in the first embodiment, when wanting a communication with the terminal unit 23 via the ISDN network 10, the terminal unit 20 inputs a call request from the man-machine interface unit 3 and activates the communication period calculating unit 72, the communication period notifying unit 74 and the waiting period notification requesting unit 75 in the originating/destination application system 9 included in the terminal unit 20.

When a transmission data amount Tcall is inputted from the man-machine interface unit 3 in response to a call request, the communication period calculating unit 72 activated calculates the communication period ti for a calling based on the transmission data amount Tcall and the line rate. When the call request is received, the communication period notifying unit 74 requests the communication period for a calling to the communication period calculating unit 72 in response to the signal Treq and then prepares an information factor notifying the communication period ti for a calling to transmit it to the signaling waiting processing unit 98 and the signaling processing unit 6.

At the same time, when the destination terminal unit 23 is during communication and in a call setting unavailable state, the waiting period notification request unit 75 prepares an information factor for requesting a notification of the calling waiting period Twait after which a call setting is available, to transmit it to the signaling waiting processing unit 98 and the signaling processing unit 6.

The signaling processing unit 6 prepares a call setting message SETUP (*1) including two pieces of information factors transmitted from the originating/destination application system 9 and then transmits it to the terminal unit 23 via the ISDN network 10.

The terminal unit 20 analyzes the received release completion message REL COMP (*1) when the release completion message REL COMP (*1) is received from the destination terminal unit 23 in response to the call setting message SETUP (*1), and then activates the call setting reserving unit 92 in the originating/destination application system 9 when it is recognized that the message includes an information factor for notifying a call waiting period Twait.

When the call setting reserving unit 92 activated recognizes by analyzing the information factor that the destination terminal unit 23 is in a call setting unavailable state and is in a call setting available state after a lapse of the waiting period Twait, it prepares to the destination terminal unit 23 an information factor for reserving a call setting to the terminal unit 20 after a lapse of the waiting period Twait, and then transmits it to the signaling waiting processing means 98 and the signaling processing unit 6. The signaling processing unit 6 prepares a call setting message SETUP (*2) including the information factor transmitted from the originating/destination application system 9 to transmit it to the destination terminal unit 23 via the ISDN network 10.

The terminal unit 20 analyzes the received release completion message REL COMP (*2) when the release completion message REL COMP (*2) from the destination terminal unit 23 is received in response to the call setting message SETUP (*2), and then transmits the release message REL to the ISDN network 10 to activate the call setting reserving unit 92 in the originating/destination application system 9 when the destination terminal unit 23 recognizes that the message includes an information factor notifying a reservation acceptance for a call setting.

When the call setting reserving unit 92 activated recognizes by analyzing the information factor that the destination terminal unit 23 has accepted a call setting reservation to the terminal unit 20 after a lapse of a period Twait, it decides that the call setting to the terminal unit 22 has been reserved after a lapse of the waiting period Twait and registers in the reservation control table 97 the call number (information regarding the destination terminal unit 23), the communication period ti for an originating reservation call calculated by the communication period calculating unit 72, the originating time (absolute time showing outgoing call processing start time) Ti after a lapse of a waiting period Twait for an originating reservation call notified from the destination terminal unit 23, and processing content (in this case, an originating or outgoing call).

Thereafter, the originating/destination application system 9 monitors an originating time registered in the reservation control table 97. When the originating/destination application system 9 recognizes that the originating time for a reserved call setting has come (or a waiting period Twait has passed), the originating processing command is notified to the signaling process executing unit 99. The signaling processing unit 6 prepares a call setting message SETUP requesting a call setting with respect to the destination terminal unit 23 to transmit it to the destination terminal unit 23 via the ISDN network 10.

Then when the signaling process executing unit 99 executes a call processing handed from the reservation control table 97, the communication period control unit 100 monitors a communication period from the outgoing call process start point. When the communication period approaches the communication period ti registered for the call processing, an interrupt signal ITRP is sent to the signaling process executing unit 99 to perform a call release request. The call process registered in the reservation control table 97 is performed sequentially in accordance with the registered communication period ti and the process start time Ti.

On the other hand, if the terminal unit 20 is in a call setting available state at the time when a call setting message SETUP (*1) is received from the another terminal unit 24, the terminal unit 20 also executes the call setting process in a well-known order since another terminal unit 24 executes the call getting process in a well-known order.

When the terminal unit 20 receives a call setting message SETUP (*1) from another terminal unit 24 during communication with another terminal unit, it analyzes the received call setting message SETUP (*1). If the terminal unit 20 recognizes that the message includes an information factor requesting a notification of the self terminal waiting period T, it activates the waiting period calculating unit 94 and the waiting period notifying unit 84 in the originating/destination application system 9.

In the waiting period calculating unit 94 activated, the final call process completion time calculating unit 95 calculates a final call process completion time after a time passed by a communication period registered for the originating reservation call or the destination reservation call time from an originating time or a destination time registered in the reservation control table 97 for finally reserved originating call or destination call. Moreover, the time difference calculating unit 96 calculates the time difference between a final call process completion time calculated by the final call process completion time calculating unit 95 as a terminal waiting period T of the terminal unit 20, at which a call requested by the call setting message SETUP (*1) is available.

For example, as shown in FIG. 9, in the reservation control table 97, the time T4+t4 obtained by adding a communication period t4 to an originating time T4 registered for a finally accepted originating call is a final call process completion time.

The information factor which is prepared for notifying the another terminal unit 24 under a destination call of the calculated terminal waiting period T is transmitted to the signaling waiting processing unit 98 and the signaling processing unit 6 by the waiting period notifying unit 94.

In order to transmit that the terminal unit 20 is during communication with another terminal unit and is in a call setting unavailable state, the signaling processing unit 6 prepares the release completion message REL COMP (*1) including the information factor sent from the originating/destination application system 9 to transmit it to another terminal unit 24 via the ISDN network 10.

During communication, when the terminal unit 20 receives a call setting message SETUP (*2) from another terminal unit 24 in accordance with the release completion message REL COMP (*1), it analyzes the received call setting message SETUP (*2). If the terminal unit 20 recognizes that the message includes an information factor for reserving a call setting after a lapse of the self terminal waiting period T, it activates the reservation accepting unit 85 in the originating/destination application system 9.

The reservation accepting unit 85 activated recognizes that another terminal unit 24 has reserved a call setting after a lapse of waiting period T by analyzing the information factor, it accepts a call setting reservation for another terminal unit 24 after a lapse of the waiting period T. Thus the reservation accepting unit 85 registers in the reservation control table 97 the call number (information regarding another terminal unit 24), the communication period ti regarding the destination reservation call notified from another terminal unit 24, the destination time (absolute time showing the destination call process start time) Ti after a lapse of the self terminal waiting period T calculated by the waiting period calculating unit 94, and the processing content (in this case, a destination call or incoming call). Then the reservation accepting unit 85 prepares an information factor notifying that the call setting reservation after a lapse of the self terminal waiting period T has been accepted to transmit it to the signaling waiting processing unit 98 and the signaling processing unit 6. The signaling processing unit 6 prepares a release completion message REL COMP (*2) including the information factor sent from the originating/destination application system 9 to transmit it to another terminal unit 24 via the ISDN network 10.

When the originating/destination application system 9 monitors the registered destination time in the reservation control table 97 and then recognizes that the destination time for a reserved call setting has come, the destination process command is notified to the signaling process executing unit 99. Then the originating/destination application system 9 waits for a destination call from another terminal unit 24 coming within a fixed period from the reserved destination time for a reservation call. If it is recognized that a call setting message SETUP has been received while a destination call has come from another terminal unit 24 at the standby, a call setting process is carried out in a well-known order by the signaling processing unit 6. As a result, since a call setting is established between the terminal unit 20 and another terminal unit 24, a desired communication is carried out.

When a destination call has not been sent from another terminal unit 24 reserved within a fixed period from the destination time, the terminal unit 20 recognizes that the reserved call setting has not been needed for it, thus canceling the reserved call setting from the reservation control table 97. In this case, the terminal unit 20 is in a vacant state till the following process. During such a period, if another call processing request occurs and the call processing is completed by the next call process start time from the present time, the call processing can be properly performed.

In the manner similar to that at the originating process, when the signaling process executing unit 99 performs a destination process handed from the reservation control table 97, the communication period control means 100 monitors the communication period from the destination call process start time. When the communication period ti registered for the destination call process is coming, an interrupt signal ITRP is outputted to the signaling process executing unit 99 to release the calling request. Thus the call process registered in the reservation control table 97 is performed sequentially in accordance with the registered communication period ti and the processing start time Ti.

Furthermore, according to the present invention, the reservation canceling unit 93 in the reservation requesting unit 91 compares the waiting period Twait notified from the destination terminal unit 23 with the waiting period T calculated by the waiting period calculating unit 94 in accordance with a notification request of the waiting period Twait from the period notification requesting unit 75. When the originating waiting period Twait is shorter than the self terminal waiting period T, since the terminal unit 20 remains its call inactive state during the waiting period Twait, the reservation canceling unit 93 inhibits the call setting reserving unit 92 from performing any reservation from another terminal unit 24.

Moreover, when the terminal unit 20 is in a call setting unavailable state during an originating call, the call setting reserving unit 93 can reserve a call setting after a time passed from the self terminal waiting period T calculated by the waiting period calculating unit 94 to the destination call terminal unit 23. When a call setting reservation from the call setting reserving unit 93 is accepted to the destination terminal unit 23, the originating reservation call is registered together with the call number (information regarding the destination terminal unit 23), the communication period ti for the originating reservation call calculated by the communication period calculating unit 72, and the originating time (an absolute time showing the originating call process start time) Ti after a time passed from the waiting period T calculated by the waiting period calculating unit 94, and the process content (in this case, an originating call or outgoing call) in the reservation control table 97. The above reservation canceling unit 93 can be omitted if the system itself has such a function.

Figure 10:
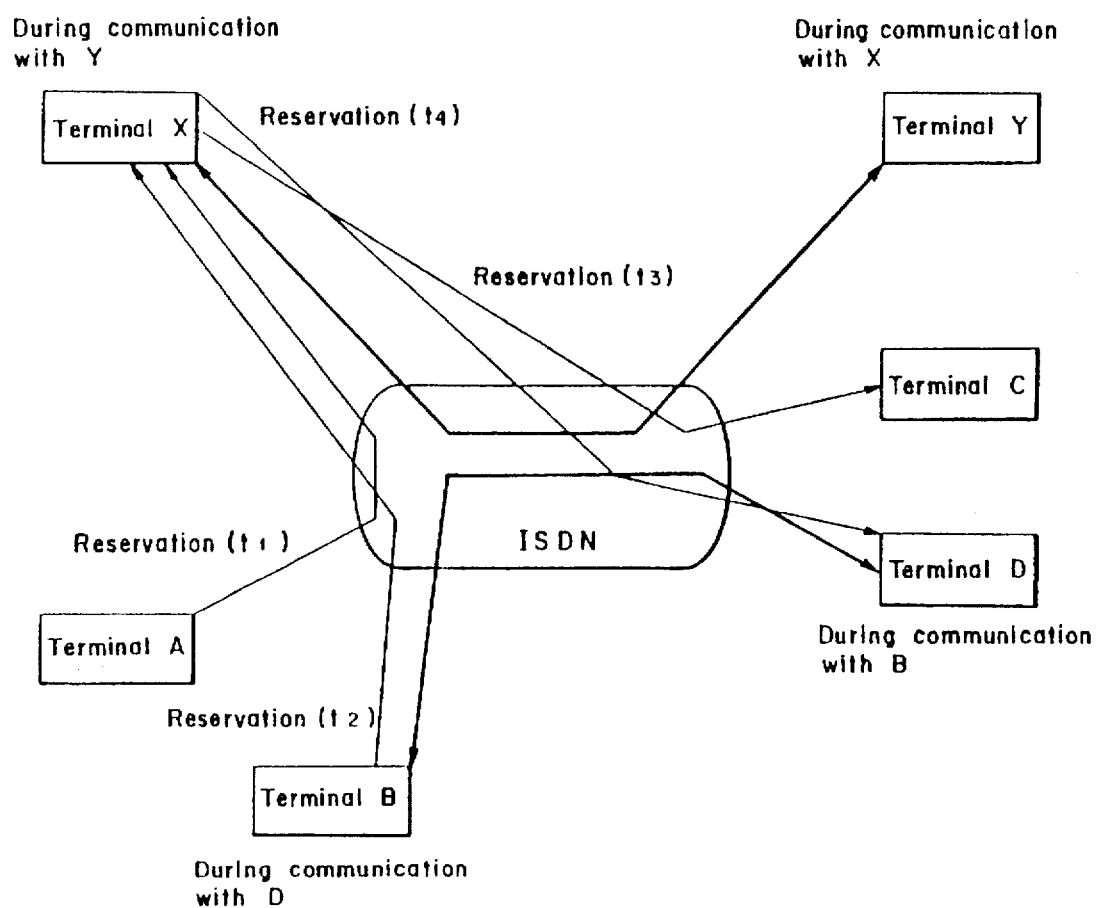
FIG. 10 is a model block diagram showing an example of a reservation call setting status according to the second embodiment of the present invention.
Figure 11:
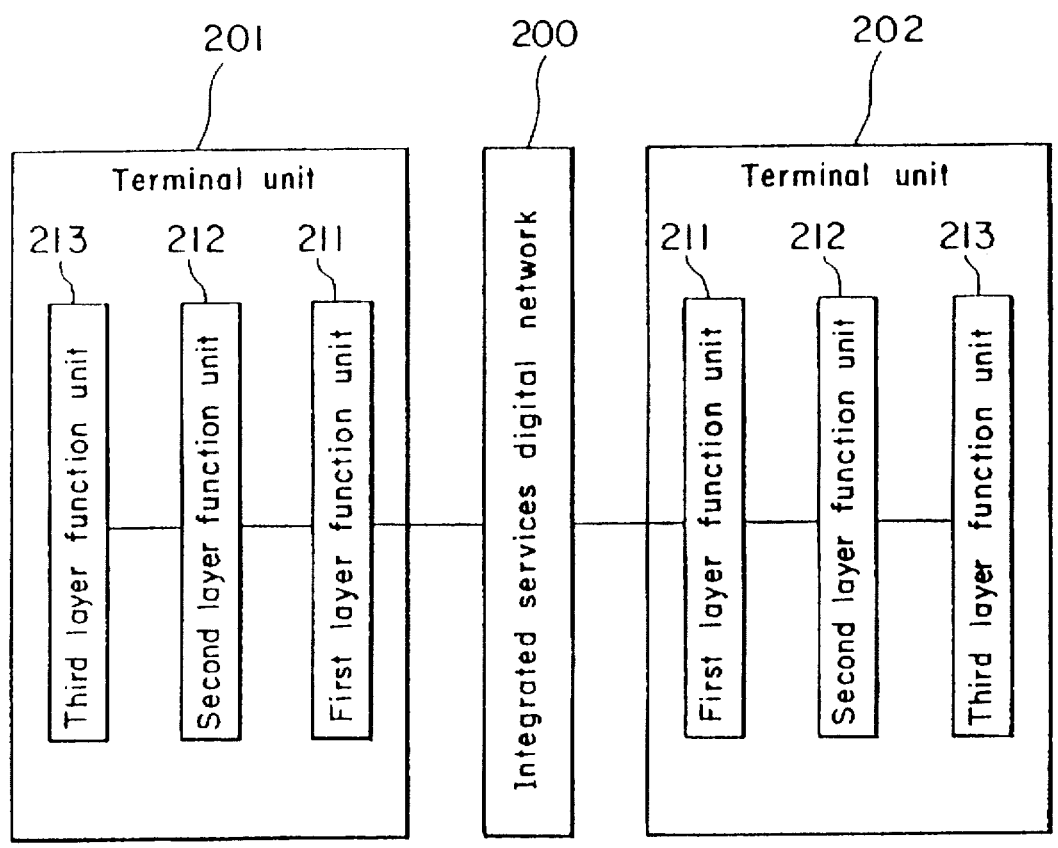
FIG. 11 is a block diagram showing an embodiment of a conventional terminal unit.

An explanation will be made below in detail as for the content registered in the reservation control table 97 shown in FIG. 9 with reference to FIG. 10. In FIG. 10, the terminal X corresponds to the terminal unit 20, the terminals A and B correspond to another terminal unit 24, respectively, and the terminals C and D correspond to the destination terminal unit 23, respectively. During the communication with the terminal Y, the reservation control table (the reservation control table for the terminal X) 97, shown in FIG. 9, registers first a destination reservation for a call setting of a communication period ti and an destination time Ti from the terminal A, then registers an originating reservation of a communication period t3 and an originating time T3 to the terminal C after the call setting of destination reservation of a communication period t2 and a destination time T2 from the terminal B communicating with the terminal D, and finally registers an originating reservation for a communication period t4 and an originating time T4 to the terminal D communicating with the terminal B.

Thus, according to the second embodiment of the present invention, like in the first embodiment, when the terminal unit 20 is in a call setting unavailable state, since the terminal unit 23 under a call setting request is busy, the waiting period Twait by which the terminal unit 23 is set to a call setting available state, is notified to the terminal unit 20. Hence the terminal unit 20 recognizes that a call getting can be requested again after a waiting period Twait while it is unnecessary to try repeatedly a call setting to the terminal unit 23.

The terminal unit 20 to which a waiting period Twait has been notified can reserve a call setting after a lapse of the waiting period Twait to the terminal unit 23. As a result, the call setting after a lapse of the waiting period Twait to the destination terminal unit 23 can be confirmed.

Moreover, when another terminal unit 24 requests a call setting to the terminal 20, even if the terminal unit 20 is busy and is in a call setting unavailable state, a call setting destination reservation after a lapse of the self terminal waiting period T of the self terminal unit 20 can be accepted from another terminal unit 24. A call setting from another terminal unit 24 after a lapse of the self terminal waiting period T can be certainly performed by waiting for a destination call from another terminal unit 24 at a reserved destination time.

The first and second embodiments according to the present invention shown in FIGS. 1 through 10 are typical ones. For example, the originating/destination application system (call setting request control unit) 9 in the second embodiment includes comprehensively the man-machine interface control unit 71, the communication period calculating unit 72, the reservation requesting unit 91, the waiting period calculating unit 94, the waiting period notifying unit 84, the reservation accepting unit 85, the reservation control table 97, the signaling waiting processing unit 98, the signaling process executing unit 99, the communication period control unit 100. However it should not be limited to only the present embodiments. The communication period calculating unit 72 may be omitted by manually inputting a substantial communication period Tman. After a waiting period Twait is notified, an operator may monitor a lapse of period and then may request again a call setting after a lapse of the waiting period Twait. A call setting reservation after a lapse of the waiting period Twait is executed automatically and only a call setting request after a lapse of the waiting period Twait may be performed manually. The terminal units 20 through 22 according to the present invention should not be limited to the embodiments shown in figures. Many other modifications may be considered without impairing advantages of the present invention.

Still other variations and modifications are possible within the scope of the present invention which is limited solely by the appended claims.

What is claimed is:

1. A call waiting processing system, comprising:
    an originating terminal unit; and
    a destination terminal unit;
    said originating terminal unit requesting a notification of a waiting period for a call setting, to said destination terminal unit when said originating terminal unit transmits an originating call to said destination terminal at a time when said destination terminal unit is in a state of being unavailable for a call setting; and
    said destination terminal unit notifying said originating terminal unit of said waiting period when said destination terminal unit receives a request for a notification of said waiting period from said originating terminal unit.

2. A call waiting processing system according to claim 1, wherein said originating terminal unit reserves a call setting to said destination terminal unit after said waiting period when said destination terminal informs said originating terminal of said waiting period.

3. A call waiting processing system according to claim 2, wherein said originating terminal unit requires a reserved call setting to said destination terminal unit after said waiting period when said designation terminal unit accepts and reserves a call setting reservation after said waiting period notified from said originating terminal unit.

4. A call waiting processing system comprising:
    an originating terminal unit for notifying a destination terminal unit of a communication period for an originating call when said originating terminal unit calls to said destination terminal unit;
    said originating terminal unit requesting a notification of a waiting period by a time available for call setting to said originating terminal unit when said destination terminal unit is in a state of being unavailable for call setting;
    said destination terminal unit calculating said waiting period when said destination terminal unit receives a request for a notification of said waiting period from said originating terminal unit and for notifying said originating terminal unit of said waiting period;
    said originating terminal unit reserving a call setting to said destination terminal unit after said waiting period when said destination terminal unit notifies said originating terminal unit of said waiting period;
    wherein said destination terminal unit registers an accepted reserved call, together with a communication period between said originating terminal unit and said destination terminal unit for said accepted reserved call, notified from said originating terminal unit and a time after said waiting period for said reserved call when said destination terminal unit reserves said call setting from said originating terminal unit, said communication period being for said reserved call notified from said originating terminal unit, while said originating terminal unit registers said reserved call together with said communication period of said reserved call and a time after said waiting period for said reserved call notified from said destination terminal unit.

5. A call waiting processing system according to claim 4, wherein said destination terminal unit obtains a call process completion time after said registered communication period from a time after said waiting period and then calculates a difference between said final call process completion time and a present time as said waiting period, said time after said waiting period being registered for a finally reserved calling.

6. A call waiting processing system according to claim 4, wherein said originating terminal unit requires a setting of said reserved call to said destination terminal unit when said time after said waiting period of said registered reserved call has come.

7. An originating terminal unit for use in a call waiting processing system, comprising:
   a communication period notifying means for notifying a destination terminal unit of a communication period necessary for a communication after calling to said destination terminal unit; and
   waiting period notification requesting means for requesting a notification of a waiting period by a time available for call setting to said destination terminal unit when said destination terminal unit is unable to set a call.

8. An originating terminal unit for use in a call waiting processing system according to claim 7, further comprising communication period calculating means for calculating said communication period based on a transmission data amount of said calling and a line rate.

9. An originating terminal unit for use in a call waiting processing system according to claim 7, further comprising call setting reserving means for reserving a call setting after said waiting period to said destination terminal unit when said waiting period is notified from said destination terminal unit in response to a request for notification of said waiting period from said waiting period notification requesting means.

10. An originating terminal unit for use in a call waiting processing system according to claim 9, further comprising reservation control means for registering a received reserved call, together with an originating time when said call setting reservation from said call setting reserving means is accepted by said destination terminal unit, said originating time being a time after a waiting period for a reservation calling has been notified from said destination terminal unit.

11. An originating terminal unit for use in a call waiting processing system according to claim 10, further comprising reservation call setting requesting means for requesting said reservation call setting to said destination terminal unit accepting said reservation call at a reservation call originating time registered in said reservation control means.

12. A destination terminal unit for use in a call waiting processing system, comprising:
   waiting period calculating means for calculating a waiting period by a time available for call setting, when a terminal unit is not able to perform a call setting; and
   waiting period notifying means for notifying an originating terminal unit which originates a call to the destination terminal unit of a waiting period calculated by said waiting period calculating means when a calling to the destination terminal unit cannot be set while a notification request of said waiting period from said originating terminal unit is received by said destination terminal unit.

13. A destination terminal unit for use in a call waiting processing system according to claim 12, further comprising reservation accepting means for accepting a reservation of said call setting when said originating terminal unit reserves a call setting after said waiting period, said originating terminal unit being informed of a waiting period by said waiting period notifying means.

14. A destination terminal unit for use in according to claim 13, further comprising reservation control means for registering an accepted reserved call, together with a communication period for said reservation call notified from said originating terminal unit and a destination time after said waiting period for said reserved call calculated by said waiting period calculating means when said reservation accepting means accepts a reservation for said call setting from said originating terminal unit.

15. A destination terminal unit for use in a call waiting processing system according to claim 14, wherein said waiting period calculating means comprises:
   final call process completion time calculating means for calculating a final call process completion time after a finally received reservation call has passed from a destination time registered by said reservation control means by a communication period registered for said reservation calling; and
   time difference calculating means for calculating as a waiting period the time difference between said final call process completion time calculated by said final call process completion time calculating means and a present time.

16. A destination terminal unit for use in a call waiting processing system according to claim 14, further comprising reservation call setting means for setting said reservation call when said originating terminal unit reserving said reservation call setting has requested said reservation call setting after said destination time of said reserved call registered in said reservation control means.

17. An originating and destination terminal unit capable of operating as an originating unit for originating a call or a destination unit for receiving a call and used in a call waiting processing system, comprising:
   communication period notifying means for notifying a further destination terminal unit of a communication period necessary for communication after calling;
   waiting period notification requesting means for requesting a notification of a waiting period by a time for call setting to said further destination terminal unit when said further destination terminal unit cannot set a calling;
   waiting period calculating means for calculating a waiting period of the originating and destination terminal unit by a time for call setting when said originating and destination terminal unit cannot perform a call setting; and
   waiting period notifying means for notifying another terminal unit of a waiting period by a time for call setting of the originating and destination terminal unit calculated by said waiting period calculating means when a call setting cannot be performed at a destination calling from said another terminal unit while a notification request of a waiting period is received from a further originating terminal in response to a time for call setting sent from said waiting period calculating means.

18. An originating and destination terminal unit used in a call waiting processing system according to claim 17, further comprising communication period calculating means for calculating said communication period based on both a transmission data amount at said calling and a line rate.

19. An originating and destination terminal unit used in a call waiting processing system according to claim 17, further comprising:

call setting reserving means for reserving a call setting after a waiting period of said further destination terminal unit to said further destination terminal unit when a waiting period of said further destination terminal unit is notified from said further destination terminal unit in accordance with a notification request of a waiting time from said waiting period notification requesting means; and reservation accepting means for accepting a reservation of said call setting when said another terminal unit reserves a call setting after a waiting period of the originating and destination terminal unit, said another terminal unit notifying of a waiting period of originating and destination terminal unit via said waiting period notifying means.

20. An originating and destination terminal unit used in a call waiting processing system according to claim 19, further comprising reservation canceling means for preventing said call setting reserving means from accepting a reservation to said further destination terminal unit when a waiting period of said further destination terminal unit which is notified from said further destination terminal unit in accordance with a waiting period notification request from said waiting period notification requesting means is shorter than the waiting period of the originating and destination terminal unit calculated by said waiting period calculating means.

21. An originating and destination terminal unit used in a call waiting processing system according to claim 19, further comprising reservation control means for registering an accepted originating reservation call together with a communication period between the originating terminal unit and the destination terminal unit for said originating reservation call and an originating time after a waiting period for said originating reservation call notified from said further destination terminal unit when a reservation for a call setting from said call setting reserving means is accepted by said further destination terminal unit, and for registering a received destination reservation call together with a communication period for said destination reservation call notified from said another terminal unit and a destination time after a waiting period for said destination reservation call calculated by said waiting period calculating means when said reservation accepting means accepts said call setting reservation from said another terminal unit.

22. An originating and destination terminal unit used in a call waiting processing system according to claim 21, wherein said waiting period calculating means comprises:

final call process completion time calculating means for calculating a final call process completion time which comes after a communication period registered for said originating reservation call or said destination reservation call from an originating time or a destination time registered in said reservation control means, regarding an originating reservation call or a destination reservation call finally reserved and accepted; and time difference calculating means for calculating as a waiting period the time difference between a final call process completion time calculated by said final call process completion time calculating means and a present time.

23. An originating and destination terminal unit used in a call waiting processing system according to claim 21, further comprising:

reservation call setting requesting means for requesting said originating reservation call setting to said further destination terminal unit which has accepted said originating reservation call when an originating time of an originating reservation call registered in said reservation control means comes; and reservation call setting means for setting said destination reservation call when another terminal unit reserving said destination reservation call requires said destination reservation call setting after a destination time of a destination reservation call registered in said reservation control means.

24. An originating and destination terminal unit used in a call waiting processing system according to claim 23, wherein said call setting reservation means reserves a call setting after a waiting period of the originating and destination terminal unit calculated by said waiting time calculating means to said further destination terminal unit when the originating and destination terminal unit is in a state of being unavailable for call setting at time of calling; and wherein said reservation control means registers said accepted originating reservation call together with a communication period of said originating reservation call and an originating time after said waiting period calculated by said waiting period calculating means when said further destination terminal unit has received said reservation of call setting from said call setting reserving means.

* * * * *